US008944897B2

(12) United States Patent  
Cho et al.

(10) Patent No.: US 8,944,897 B2  
(45) Date of Patent: Feb. 3, 2015

(54) VENTILATION SYSTEM AND CONTROLLING METHOD OF THE SAME

(75) Inventors: Min Chul Cho, Changwon-si (KR); Jae Sun Song, Changwon-si (KR); Jeong Hun Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 1049 days.

(21) Appl. No.: 12/780,173

(22) Filed: May 14, 2010

(65) Prior Publication Data

US 2010/0291857 A1  Nov. 18, 2010

(30) Foreign Application Priority Data

May 15, 2009  (KR) ......................... 10-2009-0042479

(51) Int. Cl.
*F24F 11/00* (2006.01)
*F24F 12/00* (2006.01)
*F24F 11/04* (2006.01)
(52) U.S. Cl.
CPC ........... *F24F 12/006* (2013.01); *F24F 11/0012* (2013.01); *F24F 11/0079* (2013.01); *F24F 11/04* (2013.01); *F24F 2011/0064* (2013.01); *Y02B 30/16* (2013.01); *Y02B 30/746* (2013.01); *Y02B 30/563* (2013.01)
USPC ....................................... 454/239
(58) Field of Classification Search
USPC ........... 454/238, 239, 240, 242, 232; 165/267
See application file for complete search history.

(56) References Cited

FOREIGN PATENT DOCUMENTS

| CA | 2 596 151 A1 | 2/2009 |
|---|---|---|
| CA | 2 602 737 A1 | 3/2009 |
| CN | 1888675 | 1/2007 |
| CN | 101033880 | 9/2007 |
| CN | 101178242 | 5/2008 |
| EP | 0 928 932 A1 | 7/1999 |
| EP | 1 512 921 A1 | 3/2005 |
| EP | 1 632 730 A2 | 3/2006 |
| KR | 10-2007-0089000 | 8/2007 |
| KR | 10-2007-0096084 | 10/2007 |
| WO | WO 2004/016457 A2 | 2/2004 |

OTHER PUBLICATIONS

European Search Report dated Aug. 27, 2014 issued in Application No. 10250923.9.

*Primary Examiner* — Steven B McAllister  
*Assistant Examiner* — Brittany Towns  
(74) *Attorney, Agent, or Firm* — Ked & Associates, LLP (57) ABSTRACT

A ventilation system and a controlling method of such a ventilation system are provided. The ventilation system may exhaust internal air from and draw fresh external air into a designated space. When an outdoor temperature is below a freezing point, some of the internal components of the ventilation system may be damaged due to the low external air temperature. This ventilation system controls operation of a supply fan and/or an exhaust fan based on the temperature of supplied and/or exhausted air to prevent such damage.

3 Claims, 7 Drawing Sheets

VENTILATION SYSTEM AND CONTROLLING METHOD OF THE SAME

CROSS-REFERENCE TO RELATED APPLICATION(S)

This application claims priority under 35 U.S.C. §119 to Korean Application No. 10-2009-0042479, filed in Korea on May 15, 2009, the entirety of which is incorporated herein by reference.

BACKGROUND

1. Field

This relates to a ventilation system.

2. Background

As time elapses, carbon dioxide may accumulate within an enclosed space due to respiration. A ventilation device may be used replace this contaminated air with fresh external air.

BRIEF DESCRIPTION OF THE DRAWINGS

The embodiments will be described in detail with reference to the following drawings in which like reference numerals refer to like elements wherein.

In the drawings.

DETAILED DESCRIPTION

In a ventilation device that forcibly exhausts internal air to the outside using a single ventilator, internal cold air or hot air may also be inadvertently exhausted to outside, which is disadvantageous from an energy consumption perspective. Using a single ventilator, external air may flow indoors through a window or a small opening in a door. As external air having a different temperature than internal air is drawn indoors, the temperature of the internal air may change drastically, making the room temperature uncomfortable and further impacting energy consumption.

To address these issues, a ventilation system may include a heat exchanger configured to perform a heat-exchange operation between internal air that has been drawn into the system from a designated space and exhausted outdoors (hereinafter, exhausted air) and external air that has been supplied into the designated space (hereinafter, supplied air). However, components of such a ventilation system may be adversely affected by characteristics of the external air. For example, very low external air temperatures may cause the heat exchanger installed in the ventilation system to be frozen and burst. In particular, moisture contained in the exhausted air may be cooled and frozen by the supplied air during the heat exchange performed by the heat exchanger if a temperature difference between the supplied air and the exhausted air is large. For example, if the temperature of the external air (supplied air) is at or below the freezing point, this relatively cold external air could freeze moisture accumulated in the heat exchanger and damage the heat exchanger.

Figure 1A:
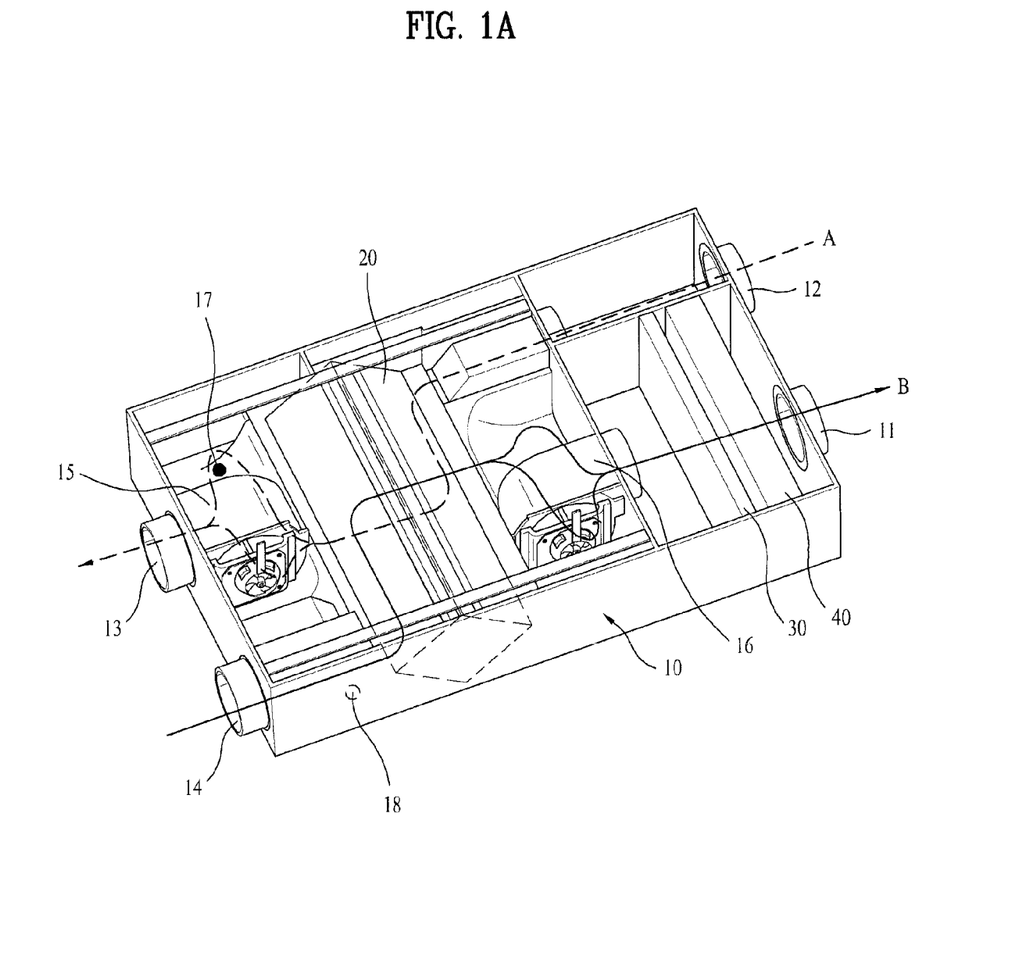
FIG. 1A is a perspective view of a ventilation system according to an embodiment as broadly described herein.

The ventilation system shown in FIG. 1A may include a first inlet 12, a second inlet 14, a first outlet 13 and a second outlet 11 provided in a case 10. Internal air may be drawn into the case 10 via the first inlet 12 and exhausted to the outside via the first outlet 13. External air may be drawn into the case 10 via the second inlet 14 and exhausted from the case 10 toward a designated space, such as, for example, an indoor space, via the second outlet 11. The inlets and outlets may be connected with one or more ducts as appropriate to communicate with the indoor space or the outside.

An exhaust path (A) may extend from the first inlet 12 to the first outlet 13 inside the case 10 and a supply path (B) may extend from the second inlet 14 to the second outlet 11 inside the case 10. In certain embodiments, the exhaust path (A) and the supply path (B) may be separated from each other to prevent the supplied air and the exhausted air from being mixed with each other. A heat exchanger 20 may be installed in the case 10 to enable heat exchange between the supplied air and the exhausted air. An air exhaust fan 15 may be installed adjacent to the first outlet 13 and an air supply fan 16 may be installed proximate the heat exchanger 20 to draw and exhaust the air that has passed through the heat exchanger 20.

A direct expansion coil 30 and a humidifier 40 may be installed between the air supply fan 16 and the second outlet 11. The direct expansion coil 30 may be used for cooling in summer and for heating in winter. The humidifier 40 may humidify the supplied air. A temperature sensor, in particular, a supplied air temperature sensor 18, may be installed between the second inlet 14 and the heat exchanger 20. The supplied air temperature sensor 18 may be installed on the supplied air path (B) to sense the temperature of external air as it enters the case 10 accordingly.

Instead of, or in addition to, the supplied air temperature sensor 18, an exhaust air temperature sensor 17 may be installed on the exhaust air path (A) to sense the temperature of the exhausted air that has passed through the heat exchanger 20. As shown in FIG. 1A, the exhaust air temperature sensor 17 may be installed between the exhaust fan 15 and the heat exchanger 20 so that the temperature of the supplied air or the exhausted air after heat exchange may be sensed in a temperature sensing step to be described later.

In the embodiment shown in FIG. 1A the exhaust air temperature sensor 17 is installed between the exhaust fan 15 and the heat exchanger 20, and is configured to measure the temperature of the exhaust air that has been heat-exchanged in the heat exchanger 20. However, the exhaust air temperature sensor 17 may instead be installed upstream of the heat exchanger 20 on the exhaust air path (A) to precisely measure the temperature of the exhaust air before heat-exchange.

An hourly flux of the exhaust air that is heat-exchanged in the heat exchanger 20 may be increased to prevent freezing when the temperature of external air is below the freezing point. As a result, to more precisely determine an appropriate rotational speed of the exhaust fan 15, it may be appropriate to more precisely determine the exact temperature of the exhaust air. More specifically, if the temperature of the exhaust air is relatively high, the rotational speed of the exhaust fan 15 necessary to prevent freezing and burst damage may be relatively low, compared with a case in which the temperature of the exhaust air is relatively low.

A controller 50 may be provided to control the ventilation system. The controller 50 may control the operation of the supply fan 16 or the exhaust fan 15 based on the temperature measured by the temperature sensors 17 or 18. An operation mode of the ventilation system will be described with reference to FIG. 2.

Figure 2:
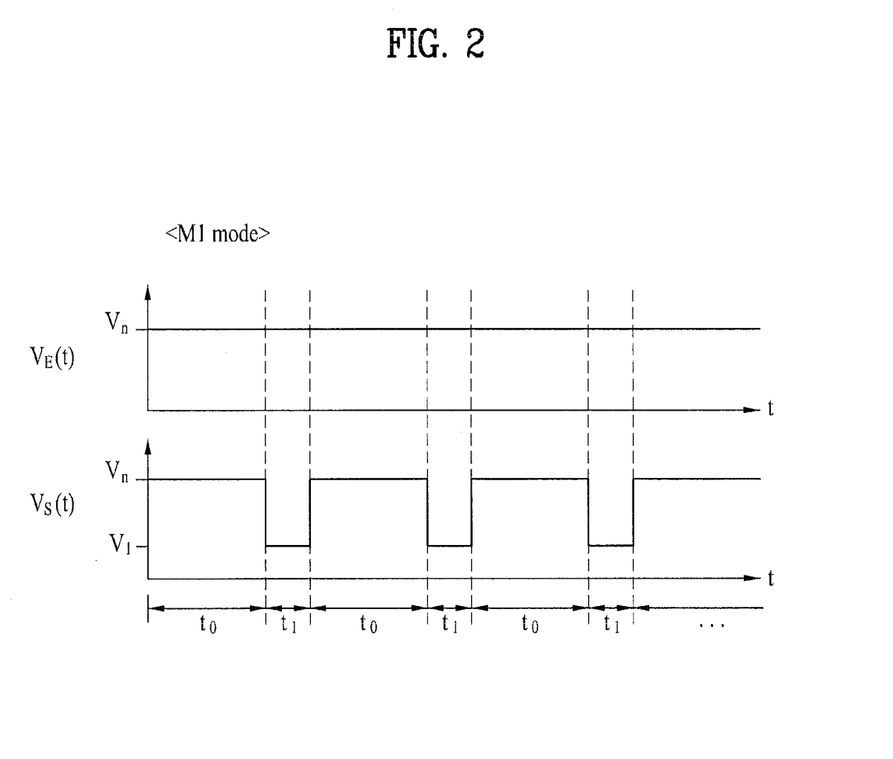
FIG. 2 is a diagram of an operational pattern of an air supply fan and an operational pattern of an air exhaust fan of the ventilation system shown in FIG. 1.

FIG. 2 illustrates an operational pattern of the supply fan 16 and the exhaust fan 15 in a first operation mode. It is assumed, simply for ease of disci fission, that the fans 15 and 16 may be rotated a normal operation speed (Vn) corresponding to a normal operation state of the exhaust fan 15 and the supply fan 16 when there is no risk of damage caused by freezing.

As a result, a variable speed of the exhaust fan 15 or supply fan 16 during the operation mode shown in FIG. 2 may be used in certain temperature conditions to prevent damage due to freezing.

Figure 1B:
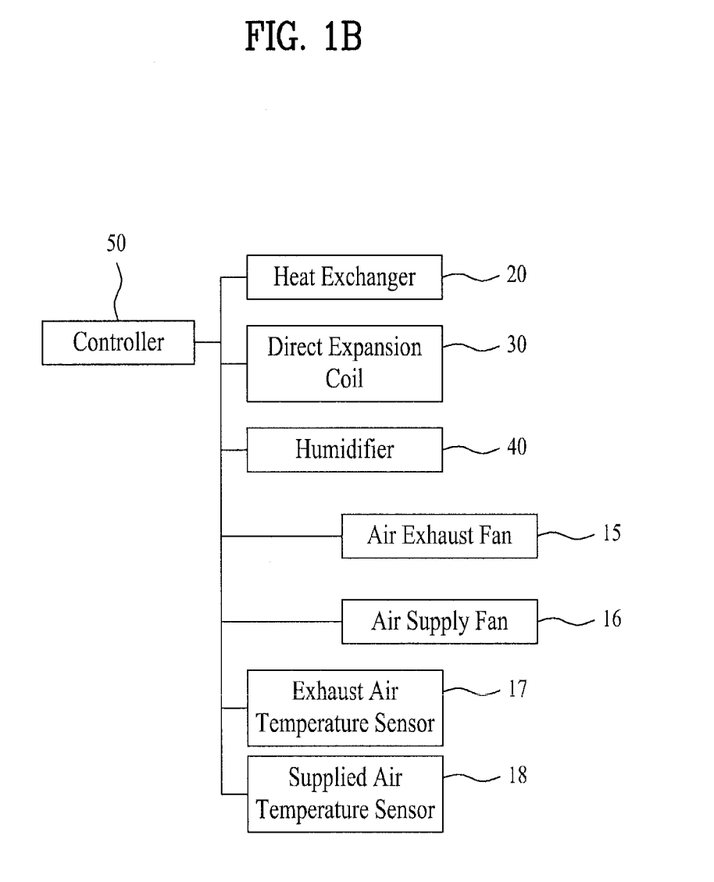
FIG. 1B is a schematic diagram of the ventilation system shown in FIG. 1.
Figure 3:
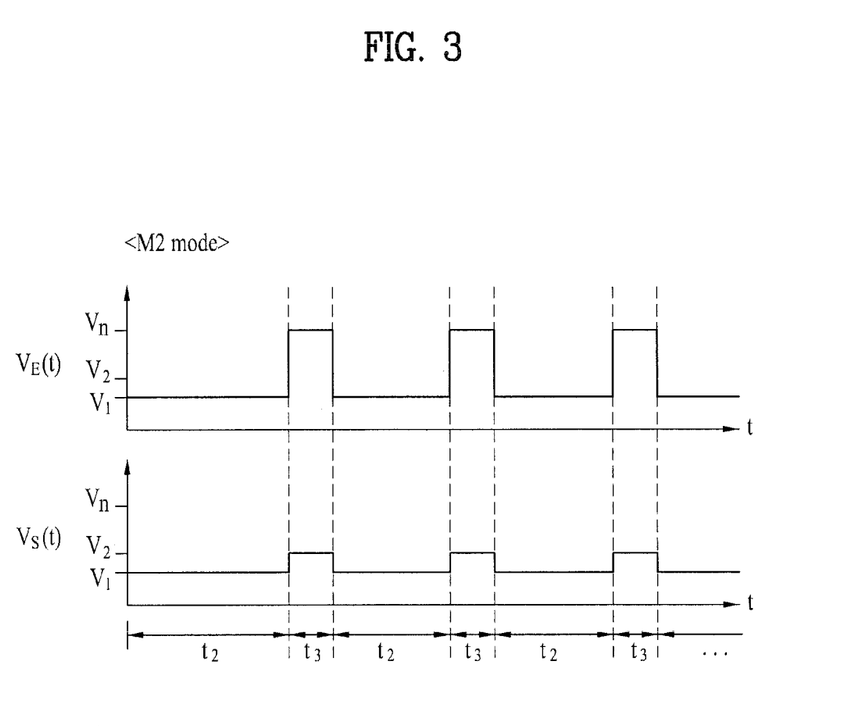
FIGS. 3 and 4 are diagrams of operational patterns of the air supply fan and the air exhaust fan shown in FIG. 2, in a second operation mode.

In the ventilation system shown in FIGS. 1A and 1B and operated as shown in FIGS. 2 and 3, the controller 50 may operate the supply fan 16 in a first operation mode (M1) when the sensed temperature value is lower than a first preset value (T1), as shown in FIG. 2, and may operate the supply fan 16 in a second operation mode (M2) when the sensed temperature value is less than a second preset value (T2), as shown in FIG. 3.

Figure 5:
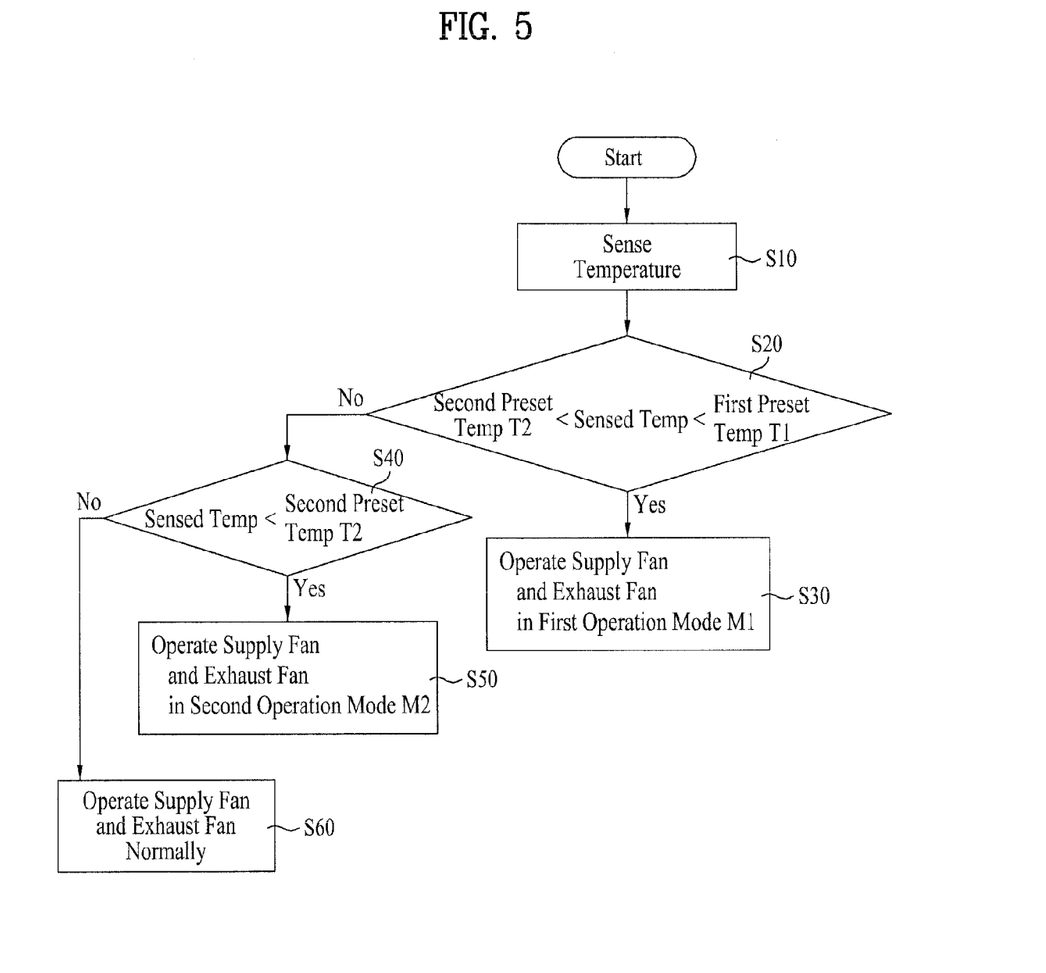
FIGS. 5 and 6 are flow charts of control methods of a ventilation system as embodied and broadly described herein

A controlling method of the ventilation system including the supply fan 16, the exhaust fan 15, the supplied air path B, the exhaust air path A, the heat-exchanger 20 and the temperature sensors 17 and/or 18 sensing the temperature of the exhaust and/or supplied air includes as embodied and broadly described herein may include sensing a temperature (S10), operating in a first operation mode (M1) (S30) and operating in a second operation mode (M2) (S50), as shown in FIG. 5. In the temperature sensing step, the system senses the temperature of air using the temperature sensor. In the first operation mode (M1), the controller 50 operates the supply fan 16 in a first operation mode (S30) if the sensed temperature less than a first preset value (T1) and greater than a second preset value (T2) (S20). In the second operation mode (M2), the controller 50 operates the supply fan 16 in a second operation mode (S50) if the sensed temperature is less than the second preset value (T2) (S40). Otherwise, the system is operated normally (S60).

Figure 6:
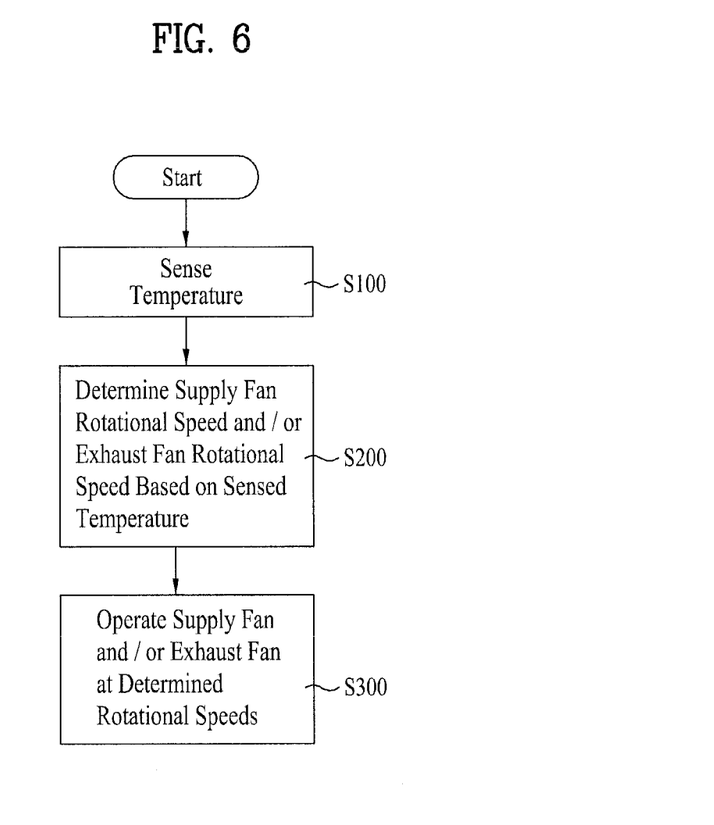

In an alternative embodiment, as shown in FIG. 6, a controlling method of a ventilation system including the supply fan 16, the exhaust fan 15, the temperature sensor 17 and/or 18 to sense the temperature of the air supplied or exhausted by the supply fan 16 or the exhaust fan 15 may include sensing a temperature (S100), determining a fan speed (S200) and controlling an air amount (S300). In the temperature sensing step the temperature of the air is sensed using the temperature sensor. In the fan speed determining step the rotational speed of the supply fan 16 or the exhaust fan 15 is determined based on the temperature of the supplied or exhausted air sensed in the temperature sensing step. The air amount controlling step controls the supply fan 16 or the exhaust fan 15 based on the rotational speed determined by the fan speed determining step. Thus, the air amount controlling step controls the amount of air flowing through the ventilation system according to the sensed temperature. The fan speed(s) determined by the method shown in FIG. 6 may be applied to be first and second operation modes M1 and M2 shown in FIG. 5.

When the temperature sensed by the temperature sensor is less than a first preset value (T1) and greater than a second preset value (T2), the first operation mode (M1) may be implemented.

In the first operation mode (M1), the exhaust fan 15 may be put into normal operation. That is, the operation of the exhaust fan 15 may be maintained in a normal state (n) corresponding to a normal operation speed (Vn).

However, the supply fan 16 may be operated at a first speed (V1) for a first preset time period (t1), periodically, as shown in FIG. 2. The supply fan 16 may be rotated at the normal operation speed (Vn) corresponding to the normal operation state (n) for a period of time (t0). The normal speed (Vn) and the first speed (V1) may be alternated periodically in the first operation mode (M1) to rotate the supply fan 16 at the first speed (v1) for the first preset time period (t1) after being rotated at the normal speed (Vn) for a preset time period (t0). In other words, if the temperature sensed by the temperature sensing step is below the first preset value (T1), plural rotational speeds of the supply fan 16 may be applied.

Thus, the supply fan 16 may be periodically operated at the first speed (V1) for the first preset time period (t1) and at the normal operation speed (Vn) for the time period (t0) in the first operation mode (M1). In certain embodiments, the normal operation time period (t0) may be longer than the first preset time period (t1). Also, the exhaust fan 15 may be operated normally in the first operation mode (M1).

If the temperature sensed by the temperature sensing step is below the first preset value (T1), the rotational speed of the supply fan 16 may be slower than the rotational speed of the exhaust fan 15 for a given period of time. The slow period may be repeated periodically. This may be applied to the second operation modes (M2) and (M2') shown in FIGS. 3 and 4. In this case, two rotational speeds of the supply fan 16 may be determined by the fan speed determining step, and at least one of these two rotational speeds may be less than the rotational speed (Vn) of the supply fan 16 during normal operation.

The rotational speeds of the supply fan 16 and the exhaust fan 15 change based on the range of temperatures sensed by the temperature sensors 17 and/or 18 that sense the temperature of the supplied or exhausted air because the temperature of the heat exchanger 20, which reaches a balance point due to the heat-exchange between the exhausted air and supplied air, is maintained above the freezing point to avoid damage due to freezing. That is, the rotational speed of the fan may be in proportion to the hourly volume of the air that is supplied or exhausted by the fan, and in proportion to the amount of energy supplied by the fan accordingly.

If the fans 15 and 16 are configured essentially the same and the rotational speed of the exhaust fan 15 is the same as that of the supply fan 16, the temperature of the heat exchanger 20 may reach a balance point temperature (of the supplied air and the exhausted air) due to the heat exchange between the supplied air and the exhausted air performed in the heat exchanger 20. However, if this balance point temperature is below the freezing point, freezing and subsequent burst damage may be caused.

Because of that, as shown in FIG. 2, the exhaust fan 15 may be rotated at the normal operation speed (Vn) corresponding to the normal mode (n) and the supply fan 16 may be periodically rotated at the first speed (V1), which is slower than the normal operation speed (Vn), for the first preset time period (t1). In this case, the balance point of the heat exchanger 20 may be significantly influenced by the air exhausted by the exhaust fan 15. Compared with the case in which the rotational speed of the fans 15 and 16 is the same, the balance point of the heat exchanger 20 may be closer to the exhausted air temperature than to the supplied air temperature.

That is, the balance point temperature of the heat exchanger 20 may be energy transmitted by the external air supplied by the supply fan 16 and the internal air exhausted by the exhaust fan 15. If the amount of supplied air is larger than the amount of the exhausted air, the balance point temperature of the heat exchanger 20 may be closer to the temperature of the exhausted air than to the temperature of the supplied air.

When the temperature sensed by the temperature sensing step is below the first preset value (T1), the fan speed determining step may determine the rotational speed of the supply fan 16 or the exhaust fan 15 for a definite integral value of the rotational speed (Vn) of the exhaust fan 15 with respect to a time axis (t) to be less than a definite integral value of the rotational speed ($V_E(t)$) of the exhaust fan with respect to a time axis (t).

As shown in FIG. 2, if the definite integral value of the rotational speed (Vs(t)) of the supply fan 16 with respect to the time axis (t) is less than the definite integral value of the rotational speed ($V_E(t)$) of the exhaust fan 15 with respect to the time axis (t), the balance point temperature of the heat exchanger 20 and the like may have a value closer to the temperature of the exhausted air. This may be applicable to embodiments shown in FIGS. 3 and 4 which will be described later.

In the first operation mode (M1) shown in FIG. 2, the supply fan 16 may be periodically rotated at the first speed (V1), which is less than the normal operation speed (Vn), for the preset time period (t1). That is, the supply fan 16 may be rotated at the normal operation speed (Vn) for the time periods t(0), and may be periodically rotated at the first speed (V1), which is less than the normal operation speed (Vn), for the first preset time period (t1) to prevent freezing and burst damage, different from the exhaust fan 15, which operates at the normal operation speed (Vn) in the first operation mode (M1). As a result, the amount of supplied air passing through the heat exchanger 20 per hour is reduced to prevent the freezing and burst problem, compared with the exhausted air. The first operation mode (M1) shown in FIG. 2 may be employed if the temperature sensed by the temperature sensing step is larger than the second preset value (T2) and smaller than the first preset value (T1).

FIG. 3 illustrates an operation pattern of the supply fan 16 and the exhaust fan 15 in the second operation mode (M2). When the sensed temperature is less than the second preset value (T2), the controller operates the supply fan 16 or the exhaust fan 15 in the second operation mode (M2) as shown in FIG. 3. Different from the embodiment shown in FIG. 2, the second operation mode (M2) shown in FIG. 3 may be employed when the temperatures sensed by the temperature sensing step is lower, and thus the system is more susceptible to the freezing and burst problem in the heat exchanger 20. In consideration of the heating load, the amount of air ventilation may be lower in the second operation mode (M2) than in the normal operation condition.

In the second operation mode (M2) shown in FIG. 3, the supply fan 16 is rotated at a first speed (V1) for a second preset time period (t2), and is rotated at a second speed (V2) for a third preset time period (t3). This rotation pattern may be repeated periodically. In certain embodiments, the second preset time period (t2) may be longer than the third preset time period (t3) and the second speed (V2) may be higher than the first speed (V1).

The exhaust fan 15 is rotated at the first speed (V1) for the second preset time period (t2), and is rotated at the normal operation speed (Vn) for the third preset time period (t3). This operation of the exhaust fan 15 may also be repeated periodically, corresponding to operation of the supply fan 16. The speed (Vn) of the exhaustion fan 15 is higher than the speed (V2) of the supply fan 16 during the third preset time period (t3) in the second operation mode (M2). As a result, the balance point temperature of the heat exchanger 20 may be more strongly influenced by the temperature of the exhausted air than the temperature of the supplied air. In this case, the speeds of the supply fan 16 and the exhaust fan 15 increase together to increase the amount of exhausted air to prevent freezing and burst of the heat exchanger 20 in the event the amount of supplied air is increased. That is, the speed of the exhaust fan 15 may be faster than the speed of the supply fan 16 in all of the periods. In the operation mode shown in FIG. 3, a definite integral value of the operational speed (Vs(t)) of the supply fan 16 with respect to the time axis (t) is smaller than a definite integral value of the rotational speed ($V_E(t)$) of the exhaust fan 15 such that the balance point temperature of the heat exchanger 20 may have a value closer to the temperature of the exhausted air.

Although the exhaust fan 15 and the supply fan 16 are rotated at the first speed (V1) for a large portion of their operation time, the amount of supplied air and exhausted air may be increased for a limited time period to increase the amount of ventilated air, and the increase of the supplied air may be larger than the increase of the exhausted air. That is, while the exhaust fan 15 is rotated at the normal operation speed (Vn) for the third preset time period (t3), the supply fan 16 is rotated at the second rotation speed (v2), which is higher that the first rotation speed (V1), but also lower than the normal operation speed (Vn).

Figure 4:
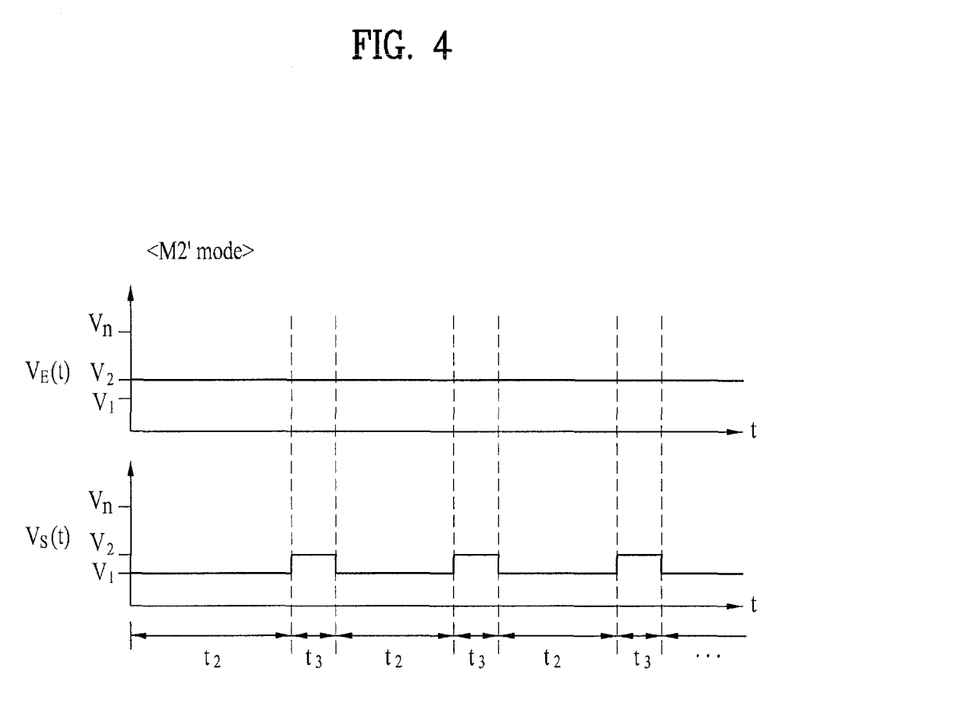

FIG. 4 illustrates another embodiment of second operation mode (M2'). Like in the second operation mode (M2) shown in FIG. 3, the controller may control the supply fan 16 and the exhaust fan 15 in the second operation mode (M2') shown in FIG. 4 if the sensed temperature is less than the second preset value (T2).

For example, if contamination of indoor air is severe or there is less of a heating load, the exhaust fan 15 is rotated relatively fast, at the second rotational speed (V2), and the supply fan 16 is periodically rotated at the second rotational speed (V2) like the exhaust fan 15.

In the embodiment shown in FIG. 4, the exhaust fan 15 may be rotated at the second speed (V2) during the second operation mode (M2'). The supply fan 16 may be rotated at the first speed (V1) for the second preset time period (t2) and at the second speed (V2) for the third preset time period (t3).

The first and second preset temperature values (T1) and (T2) using the supplied air temperature sensor 18 may be different from the first and second preset temperature values (T1) and (T2) using the exhaust air temperature sensor 17. For example, when using the supplied air temperature sensor 18, the first preset value (T1) may be −10° C. and the second preset (T2) value may be −15° C. When using the exhaust air temperature sensor 17, the first preset value (T1) may be 0° C. and the second preset value (T2) may be −3° C. Also, in case of using the exhausted air temperature sensor 17, the temperature of the exhausted air is measured, and the first preset temperature value (T1) may be a temperature above the freezing point. Other values for the preset temperature values (T1) and (T2) may also be appropriate. One or both of the supplied air temperature sensor 18 and the exhaust air temperature sensor 17 may be used to make these determinations.

A ventilation system and a controlling method of the same are provided.

A ventilation system as embodied and broadly described herein may prevent inner components from damage due to freezing and burst in winter by controlling operation of a fan based on a temperature of supplied or exhausted air.

A controlling method of a ventilation system as embodied and broadly described herein, the ventilation system comprising a supply fan, an exhaustion fan, a supplied air path, an exhausted air path, a heat exchanger configured to enable supplied air and exhausted air to heat-exchange with each other and a temperature sensor sensing the temperature of the supplied or exhausted air, may include a temperature sensing step sensing the temperature by using the temperature sensor; a first operation mode operating the supply fan in a first operation mode, in case the sensed temperature is smaller than a first preset value and larger than a second preset value; and a second operation mode operating the supply fan in a second operation mode, in case the sensed temperature is smaller than the second preset value.

The supply fan may be operated to be rotated at a first speed for a first preset time period periodically during a normal operation.

The normal operation time may be longer than the first preset time period.

In the first operation mode, the exhaustion fan may be normally operated.

In the second operation mode, the supply fan may be operated to be rotated at a first speed for a second preset time period and at a second speed for a third preset time period periodically and repeatedly.

The second preset time period may be longer than the third preset time period and the first speed may be lower than the second speed.

In the second operation mode, the exhaustion fan may be operated to be rotated at a first speed for a second preset time period and the exhaustion fan may be normally operated for a third preset time period periodically and repeatedly.

The exhaustion fan may be operated to be rotated at a second speed continuously in the second operation mode.

In the temperature sensing step, the temperature of supplied air or exhausted air after heat-exchanging with the supplied air may be sensed.

A ventilation system as embodied and broadly described herein may include a case comprising a supplied air path to supply external air to indoor and an exhausted air path to exhaust internal air to outdoor; a heat exchanger configured to enable the supplied air and the exhausted air to heat-exchange with each other; a supply fan configured for the air supply; an exhaustion fan configured for the air exhaustion; a temperature sensor sensing the temperature of the supplied or exhausted air; and a controller operating the supply fan in a first operation mode, in case the sensed temperature is smaller than a first preset value and larger than a second preset value, and to operate the supply fan in a second operation mode, in case the sensed temperature is smaller than the second preset value.

The ventilation system may also include a direct expansion coil or a humidification unit configured to heat or humidify the supplied air having passed the heat exchanger.

A controlling method of a ventilation system comprising a supply fan, an exhaustion fan and a temperature sensor sensing the temperature of the supplied or exhausted air supplied or exhausted by the supply fan or exhaustion fan as embodied and broadly described herein may include a temperature sensing step sensing the temperature by using the temperature sensor; a fan speed determining step determining a rotational speed of the supply fan or exhaustion fan based on the temperature of the supplied or exhausted air sensed in the temperature sensing step; and a air amount controlling step controlling the supply fan or the exhaustion fan based on the rotational speed determined in the fan speed determining step.

A plurality of rotational speeds of the supply fan may be determined in the fan speed determining step, in case the temperature sensed in the temperature sensing step is below a first preset value.

Two rotational speeds of the supply fan may be determined in the fan speed determining step and at least one of the two rotational speeds of the supply fan may be lower than a rotational speed of the supply fan in a normal operation.

The rotational speed of the supply fan may include a predetermined period in which the rotational speed of the supply fan is slower than a rotational speed of the exhaustion fan, in case the temperature sensed in the temperature sensing step is below the first preset value.

The period in which the rotational speed of the supply fan is smaller than the rotational speed of the exhaustion fan may be periodically repeated.

A definite integral value of the rotational speed (Vs(t)) of the supply fan with respect to a time axis (t) may be smaller than a definite integral value of the rotational speed (Ve(t)) of the exhaustion fan with respect to the time axis (t), in case the temperature sensed in the temperature sensing step is below the first preset value.

The supply fan may be operated to be rotated at a slower speed than a normal speed corresponding to a normal mode for a preset time period periodically, in case the temperature sensed in the temperature sensing step is higher than a second preset value and lower than a first preset value.

In a system and method as embodied and broadly described herein, operation of the supply fan or the exhaustion fan may be controlled according to a condition of an outdoor temperature and inner components provided in the ventilation system may be prevented from damage due to freezing and burst.

Furthermore, in a case in which the supply fan is continuously rotated, not stopped, the temperature of external air may be continuously sensed. As a result, changes in temperature may be dealt with quickly.

Still further, even in a case in which the temperature of external air is below zero, the ventilation system is not stopped. As a result, user convenience may be improved.

Additionally, various operation modes may be provided according to the temperatures of external air. As a result, optimized ventilation may be enabled.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A controlling method of a ventilation system comprising a supply fan that draws supplied air along a supplied air path, an exhaust fan that draws exhausted air along an exhausted air path, a heat exchanger that performs a heat exchange between the supplied air and the exhaust air, and a temperature sensor that senses a temperature of the supplied or exhausted air, the method comprising:

sensing a temperature using the temperature sensor;

operating the supply fan and the exhaust fan in a normal operation mode when the sensed temperature is greater than a first preset value;

operating the supply fan and the exhaust fan in a first operation mode when the sensed temperature is less than the first preset value and greater than the second preset value; and operating the supply fan and the exhaust fan in a second operation mode when the sensed temperature is less than the second preset value, wherein operating the supply fan and the exhaust fan in the normal operation mode comprises:

rotating the supply fan and the exhaust fan continuously at a normal operation speed operating; and operating the supply fan and the exhaust fan in the first operation mode comprises:

rotating the supply fan periodically at a first speed for a first preset time period between periods of rotating the supply fan at the normal operation speed for a normal operation time period; and when the sensed temperature is a temperature of supplied air, rotating the exhaust fan at the normal operation speed with the supply fan operating; and operating the supply fan and the exhaust fan in the second operation mode comprises:

rotating the supply fan periodically and repeatedly at the first speed for a second preset time period at then at a second speed for a third preset time period; and rotating the exhaust fan periodically and repeatedly at the first speed for the second preset time period and at the normal operation speed for the third preset time period while the supply fan operates; and wherein the second speed is greater than the first speed, and the second speed is less than the normal operation speed and wherein a duration of the normal operation time period is greater than a duration of the first preset time period, and the duration of the second preset time period is greater than a duration of the third preset time period.

2. The method of claim 1, further comprising when the sensed temperature is a temperature of exhausted air after heat exchange with the supplied air, continuously rotating the exhaust fan at the second speed in the second operation mode.

3. The method of claim 1, wherein sensing a temperature comprises sensing a temperature of supplied air, or sensing a temperature of exhausted air after heat exchange with the supplied air.

* * * * *